United States Patent [19]

Suzuki et al.

[11] Patent Number: 5,073,226

[45] Date of Patent: Dec. 17, 1991

[54] CYLINDRICAL MEMBER FORMING APPARATUS

[75] Inventors: Shoujyu Suzuki; Yutaka Takasuga, both of Kodaira, Japan

[73] Assignee: Bridgestone Corporation, Tokyo, Japan

[21] Appl. No.: 580,997

[22] Filed: Sep. 12, 1990

[30] Foreign Application Priority Data

Sep. 12, 1989 [JP] Japan .................................. 1-236710

[51] Int. Cl.⁵ ...................... B29D 30/24; G03D 15/04
[52] U.S. Cl. ................................... 156/417; 156/134; 156/502; 156/304.2; 156/447
[58] Field of Search ..................... 156/122, 134, 304.1, 156/304.2, 502, 417, 447

[56] References Cited

U.S. PATENT DOCUMENTS 4,328,066 5/1982 Kiuchi et al. .................... 156/304.1
4,765,862 8/1988 Azuma ............................. 156/304.1

FOREIGN PATENT DOCUMENTS 63-1531 1/1988 Japan .

Primary Examiner—Michael W. Ball
Assistant Examiner—Francis J. Lorin
Attorney, Agent, or Firm—Sughrue, Mion, Zinn, Macpeak & Seas

[57] ABSTRACT

An apparatus for forming a cylindrical member includes a forming drum having a cylindrical unit formed with a slit extending in an axial direction of the cylindrical unit and around which a belt-shaped member is wound wherein a slight clearance between both ends of the belt-shaped member are aligned with the slit of the cylindrical unit. The cylindrical unit of the forming drum is composed of a plurality of arcuate segments radially movable and having suction devices on their outer circumferences for holding the belt-shaped member by suction. The cylindrical unit includes clearance regulating members capable of penetrating into tghe clearance of the belt-shaped member, a first joining unit arranged in the forming drum aligned with the slit, and a second joining unit arranged on an outer side of the forming drum and movable toward and away from the first joining unit. When the first and second joining units embracing the belt-shaped member are pushed toward each other, the both ends of the belt-shaped member wound around the forming drum are pulled together and butt joined.

9 Claims, 7 Drawing Sheets

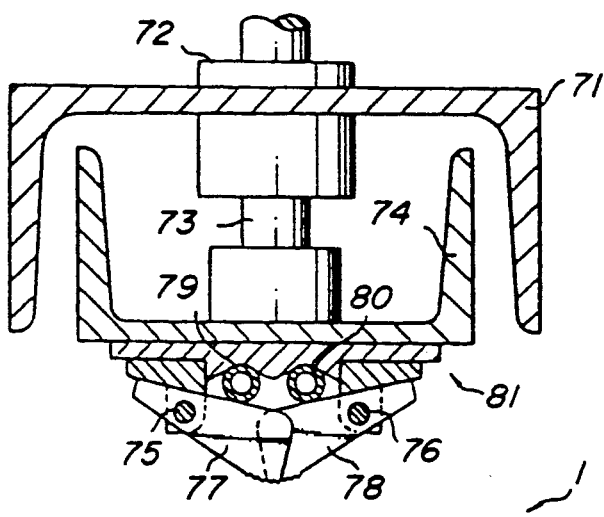
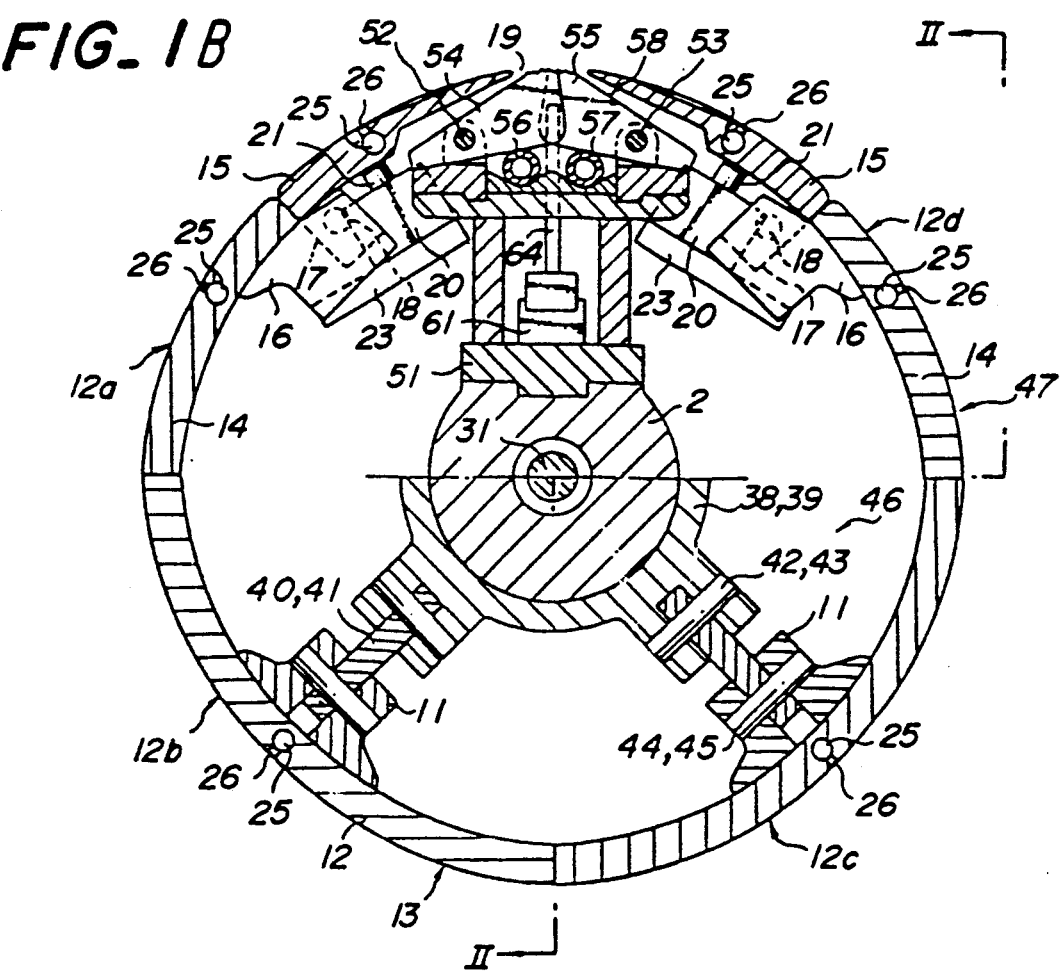

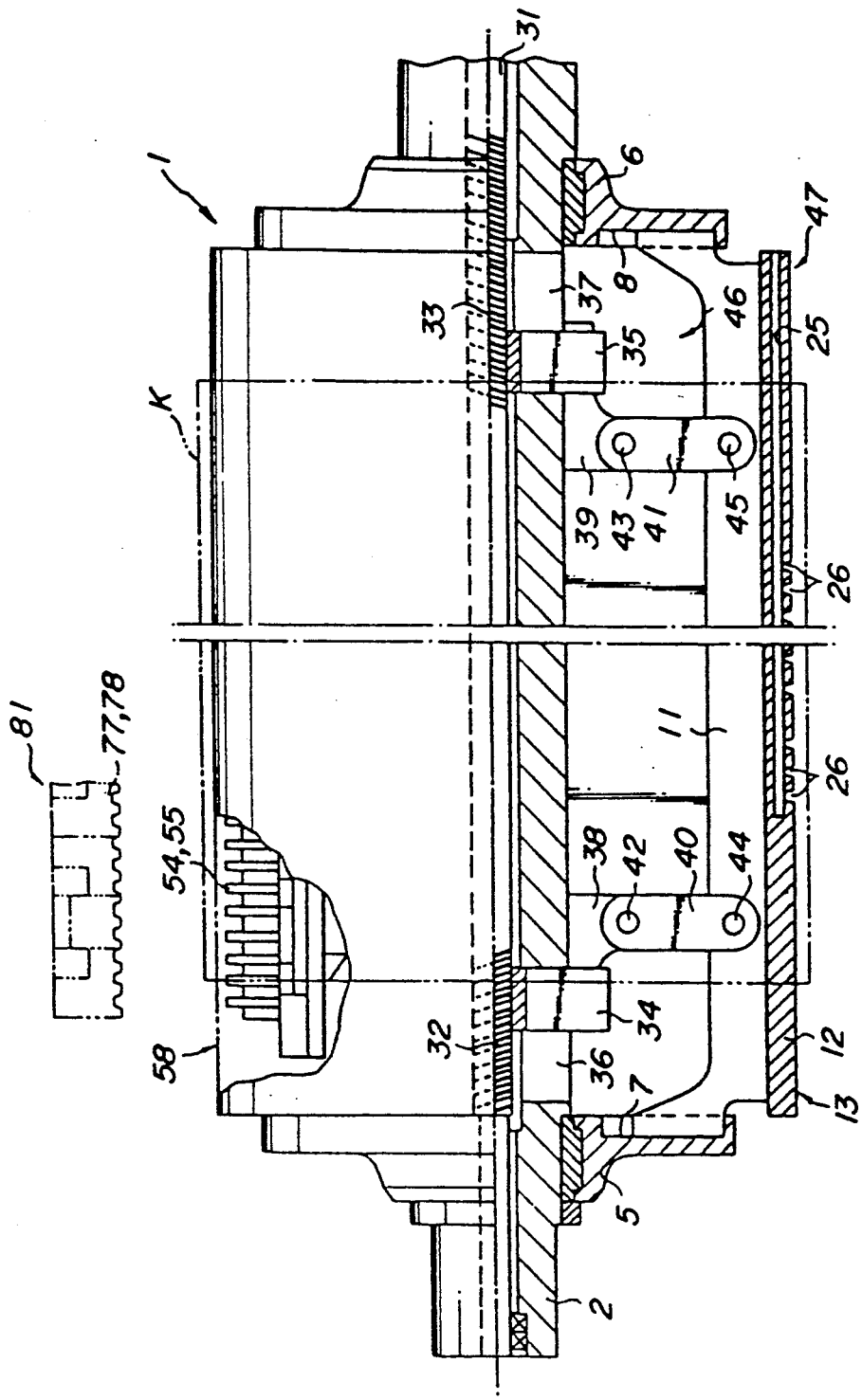

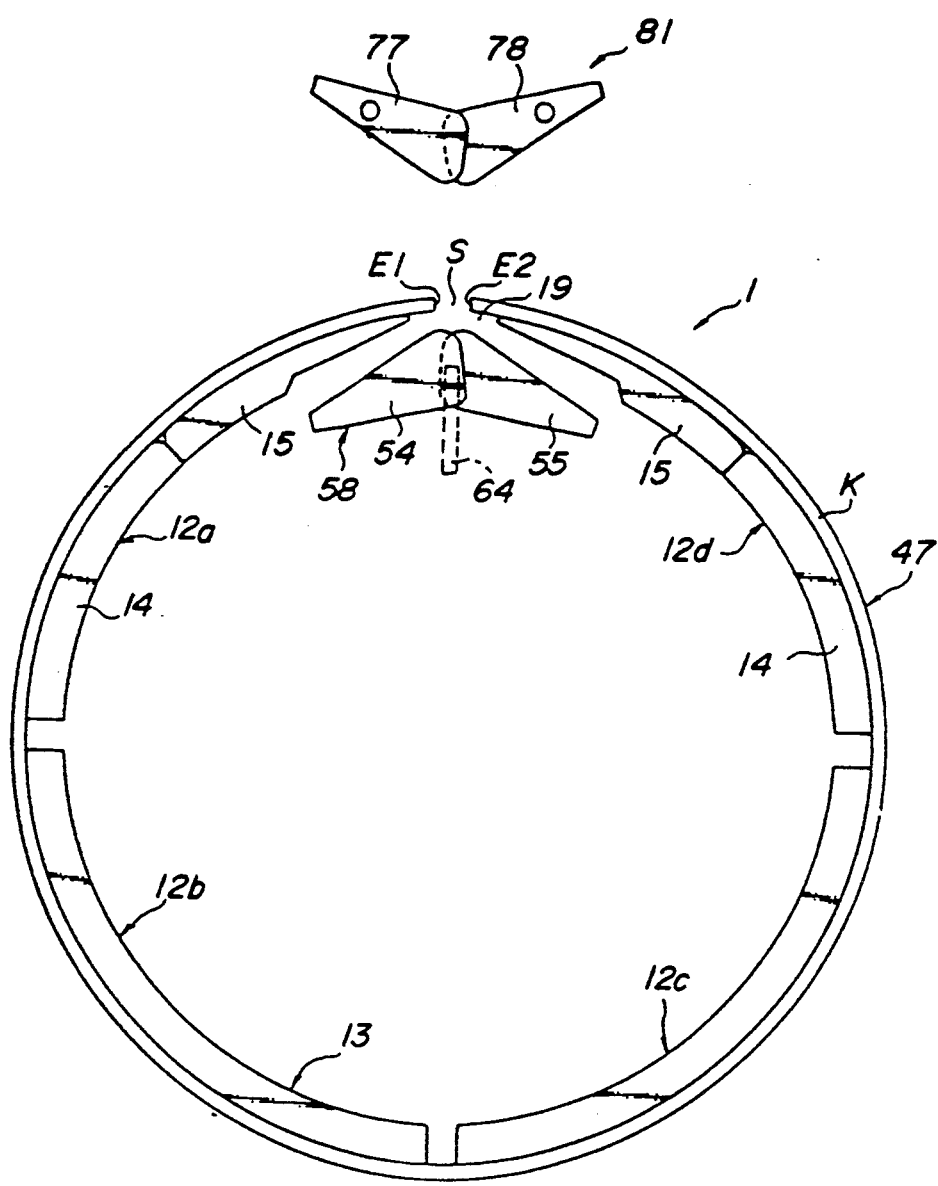
FIG_4a

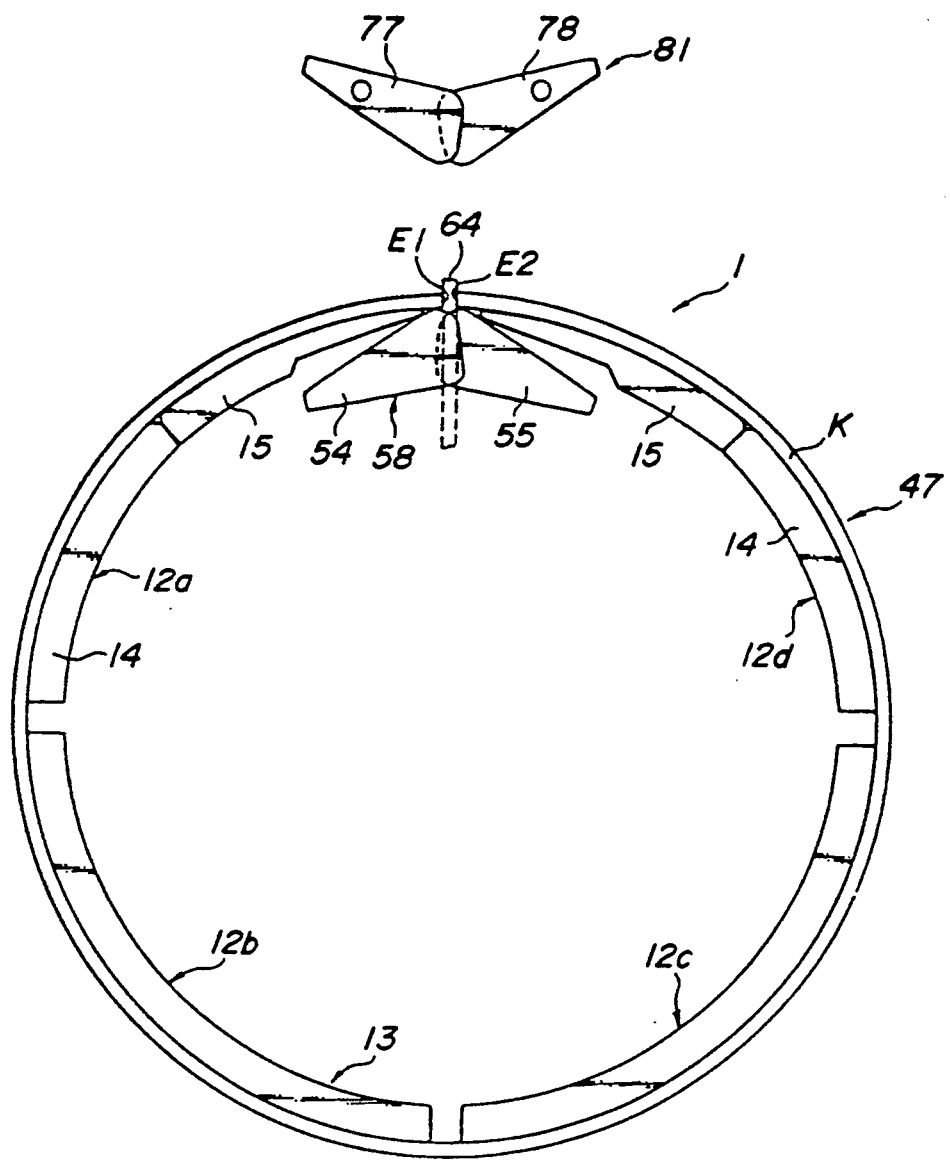

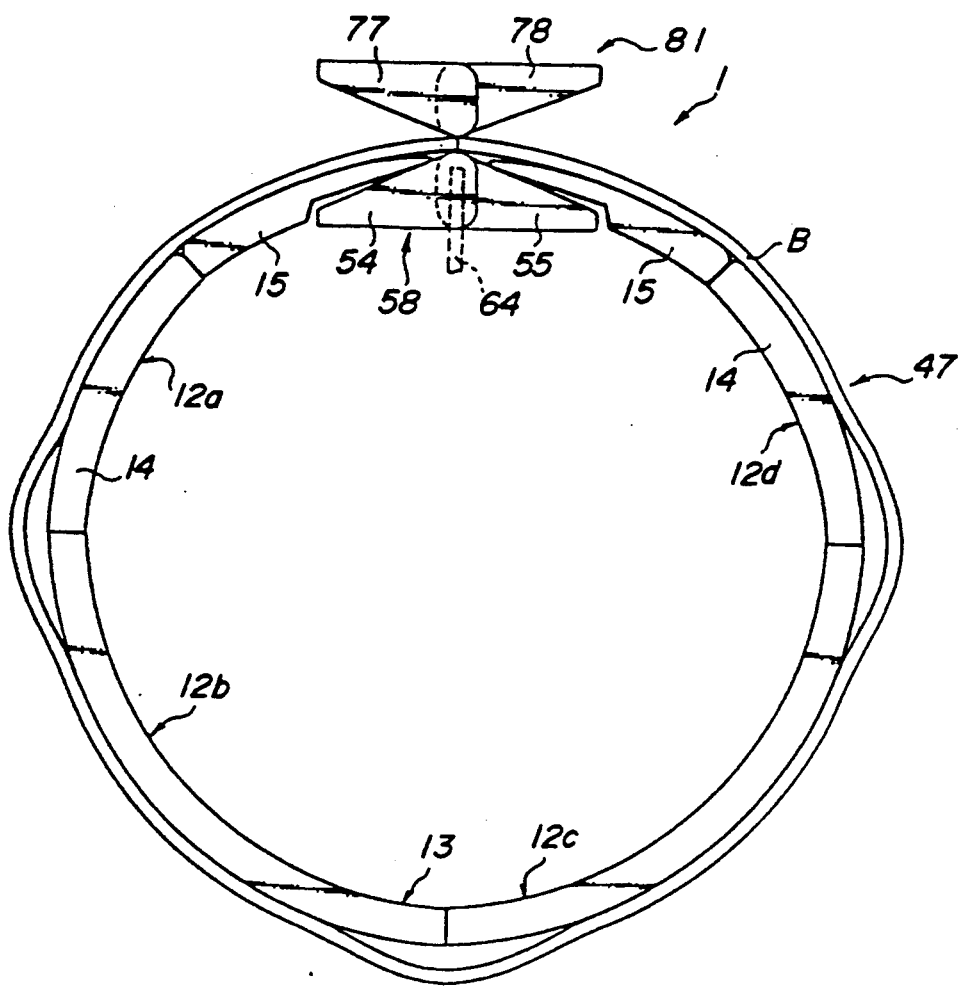
FIG_4d

5,073,226

CYLINDRICAL MEMBER FORMING APPARATUS

BACKGROUND OF THE INVENTION

This invention relates to an apparatus for forming a cylindrical member, for example, a carcass band or the like constituting a pneumatic tire by firmly butt joining both ends of a belt-shaped member.

Cylindrical member forming apparatuses have been known, for example, as disclosed in Japanese Patent Application Laid-open No. 63-1,531. An apparatus disclosed in the Laid-open Application includes a forming drum having a continuous cylindrical outer circumferential surface on which a belt-shaped member is wound with a slight clearance between both ends of the member, and a disc-like guide roll. A frustoconical joining roll are arranged on an outer side of the forming drum. The apparatus further includes cylinders causing these guide and joining rolls to approach the forming drum to press the guide roll against an outer surface of the one end of the belt-shaped member and the joining roll against an outer surface of the other end of the belt-shaped member. The apparatus further includes moving means for pulling both the ends of the belt-shaped member closer together and butt joining the ends by rolling the guide and joining rolls along the clearance between both the ends of the belt-shaped member.

With such a disclosed apparatus, however, only the outer surfaces of the ends of the belt-shaped member are pulled closer together and butt joined by means of the guide and joining rolls. Therefore, there is a problem in that inner surfaces of the ends of the belt-shaped member in close contact with the forming drum are joined insufficiently with a low joining strength.

SUMMARY OF THE INVENTION

It is an object of the invention to provide a cylindrical member forming apparatus capable of pulling closer together both ends of a belt-shaped member wound in the form of a cylinder on both inner and outer sides.

In order to accomplish this object, an apparatus for forming a cylindrical member according to the invention comprises a forming drum having a cylindrical unit formed with a slit extending in an axial direction of the cylindrical unit and around which a belt-shaped member is wound to form a slight clearance between both ends of the belt-shaped member to be aligned with the slit of the cylindrical unit, a first joining unit arranged in the forming drum to be in opposition to the slit, and a second joining unit arranged on an outer side of the forming drum and movable toward and away from the first joining unit, and on approaching said first joining unit, pulling closer together the both ends of the belt-shaped member wound around the forming drum and butt joining the both ends in cooperation with the first joining unit.

In forming a cylindrical member with the apparatus according to the invention, first a belt-shaped member is wound around the cylindrical unit of the forming drum. In this case, there is provided a slight clearance between both ends of the belt-shaped member in alignment with the slit of the cylindrical unit. The first and second joining units are then moved toward each other so that both the ends of the belt-shaped member are pulled closer together and butt joined with each other at the slit of the cylindrical unit. Since the first and second joining units are arranged on the inner and outer sides of the forming drum, respectively, an inner and an outer surface are pulled closer together by means of the first and second joining units, respectively. Therefore, both the ends of the belt-shaped member are joined on the forming drum with high strength in a reliable manner.

According to the invention the cylindrical unit of the forming drum comprises a plurality of arcuate segments radially movable and having suction means on outer circumferences for holding the belt-shaped member by suction. Moreover, the forming drum comprises clearance regulating members capable of penetrating into the clearance of the belt-shaped member. Therefore, after the belt-shaped member has been wound around the cylindrical unit, the clearance regulating members extend through the clearance between the both ends of the belt-shaped member. The arcuate segments are then moved radially inwardly holding the belt-shaped member by the suction of the suction means to press both the ends of the belt-shaped member against the clearance regulating members to regulate the clearance between the both ends at a predetermined value. Thereafter, the clearance regulating members are retracted from the clearance, while both the ends of the belt-shaped member are butt joined by the fist and second joining units.

With this arrangement, the clearance between both the ends of the belt-shaped member wound around the forming drum can be exactly and easily regulated at a predetermined value. As a result, both the ends of the belt-shaped member can be butt joined more securely with higher strength.

The invention will be more fully understood by referring to the following detailed specification and claims taken in connection with the appended drawings.

BRIEF DESCRIPTION OF THE DRAWINGS

FIG. 1A is a front sectional view illustrating one embodiment of an apparatus according to the invention;

FIG. 1B is a top sectional view of the embodiment in FIG. 1A;

FIG. 2 is a sectional view taken along the line II—II in FIG. 1;

FIGS. 4a, 4b, 4c and 4d are views for explaining the operation of the apparatus shown in FIG. 1.

EXPLANATION OF THE PREFERRED EMBODIMENTS

Figure 3:
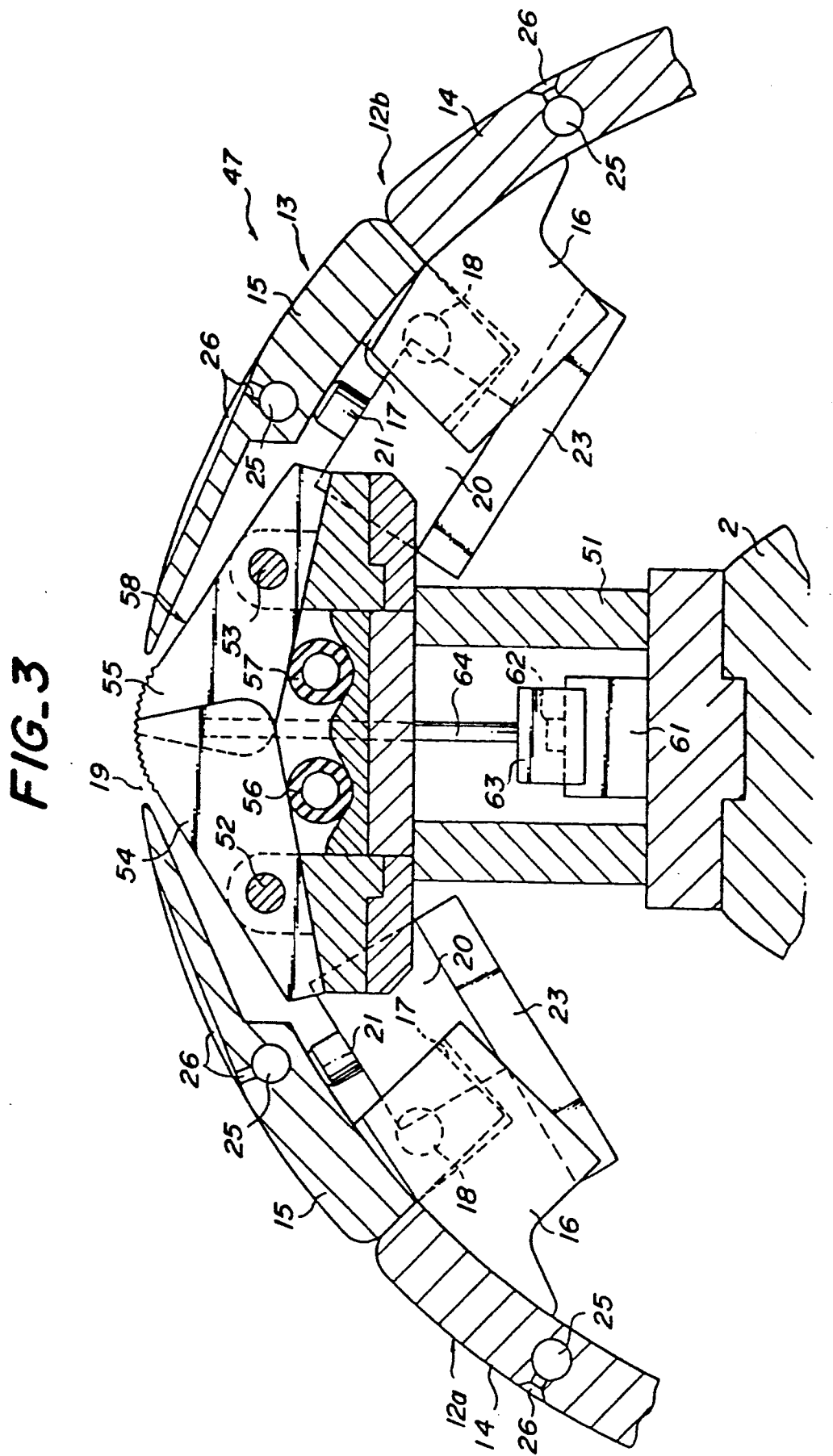
FIG. 3 is a front sectional view illustrating the proximity of a first joining unit used in the apparatus shown in FIG. 1.

FIGS. 1A, 1B, 2 and 3 illustrate a cylindrical member forming apparatus according to the invention for forming a cylindrical member, for example, a carcass band by bringing ends of a belt-shaped member, for example, a carcass ply into abutment with and butt joining them with each other. The apparatus 1 comprises a horizontal hollow main shaft 2 adapted to be rotated about its axis by driving means (not shown) of the apparatus 1. To forward and a rearward ends are secured guide members 5 and 6 substantially in the form of discs. Inner surfaces of the guide members 5 and 6 in opposition to each other are formed with a plurality of radially extending guide grooves 7 and 8.

Reference numeral 11 denotes a plurality (four in this embodiment) of connecting ribs extending in parallel with the main shaft 2 and circumferentially substantially equally spaced thereabout. Forward and rearward ends of the connecting ribs 11 are slidably inserted in the guide grooves 7 and 8 of the guide members 5 and 6. As a result, the connecting ribs 11 are supported movably in radial directions by the guide members 5 and 6.

To radially outward ends of the connecting ribs 11 are fixed a plurality (four in this embodiment) of arcuate segments 12a, 12b, 12c and 12d (representatively 12) having arcuate sections to form as a whole a cylindrical unit 13 surrounding the main shaft 2. Among these arcuate segments 12, each of the adjacent arcuate segments 12a and 12d consists of a first and a second segment piece 14 and 15 having equal circumferential lengths. A bracket 16 is fixed to an inner surface of an end of the first segment piece 14 adjacent the second segment piece 15, while a bracket 17 is fixed to an inner surface of an end of the second segment piece 15 adjacent the first segment piece 14, respectively. These brackets 16 and 17 are pivotally connected to each other by means of a pin 18 so that the second segment piece 15 is rockably supported about the pin 18 by the first segment piece 14.

The first segment pieces 14 of the arcuate segments 12a and 12d are arranged on the spaced side of these segments, whereas the second segment pieces 15 are arranged on the close side. A slit 19 extending over a longitudinal length of the cylindrical unit 13 in its axial direction is formed between extreme edges of the second segment pieces 15 of the cylindrical unit 13.

A cylinder 20 is fixed to each of the brackets 16 through a plate 23 and has a piston rod 21 whose rod end abuts against an inner surface of the second segment piece 15 of each of the arcuate segments 12a and 12d. When the piston rod 21 of the cylinder 20 is extended, the second segment piece 15 is rocked outwardly about the pin 18 until an outer circumferential surface of the second segment piece 15 is positioned on a curved extension of an outer circumferential surface of the first segment piece 14 so that these outer circumferential surfaces are positioned on substantially the same arcuate surface. The cylinders 20 are connected through hoses and rotary joints (not shown) to a pressurized fluid source.

A suction passage 25 extending in the axial direction of the cylindrical unit 13 is formed in each of the arcuate segments 12 of the cylindrical unit 13. With the arcuate segments 12a and 12d, the suction passages 25 are formed in both the first and second arcuate segment pieces 14 and 15, respectively. An outer circumferential surface of each of the arcuate segments 12 is formed along the suction passage 25 with a number of suction openings 26 as suction means which open at the circumferential surface and communicate with the suction passage 25. The suction passages 25 are connected to a vacuum source through hoses and rotary joints (not shown).

Into the main shaft 2 is inserted a screw shaft 31 which is coaxial with the main shaft 2 and is rotated independently of or together with the main shaft 2. The screw shaft 31 is formed on a forward and a rearward end portion with male screws 32 and 33 in opposite directions on which female screw blocks 34 and 35 are threadedly engaged, respectively. The female screw blocks 34 and 35 extend through guide slits 36 and 37 formed in the main shaft 2 and extending in the axial direction thereof and are connected with their inner ends to annular members 38 and 39 slidably supported by the main shaft 2.

Reference numerals 40 and 41 illustrate plural (four in this embodiment) pairs of links whose inner ends are pivotally connected to the annular member 38 and 39 by means of pins 42 and 43 and outer ends are pivotally connected to the connecting ribs 11 by means of pins 44 and 45. When the screw shaft 31 is rotated relative to the main shaft 2, the female screw blocks 34 and 35 are moved together with the annular members 38 and 39 in opposite axial directions of the cylindrical unit 13 to rock the links 40 and 41.

The guide members 5 and 6, the connecting ribs 11, the screw shaft 31, the female screw blocks 34 and 35, the annular members 38 and 39 and the links 40 and 41 form as a whole a moving mechanism 46 as diameter changing means for moving the arcuate segments 12 in radial directions in synchronism with each other, whereby the cylindrical unit 13 of the arcuate segments 12 is expanded to increase its diameter or is contracted to decrease its diameter. Moreover, the main shaft 2, the cylindrical unit 13 and the moving mechanism or diameter changing means 46 form as a whole a forming drum 47. A carcass ply K is wound around the cylindrical unit 13 of the forming drum 47. In this case, a slight clearance S is formed between both ends E1 and E2 of the carcass ply K so as to be in alignment with the slit 19 between the second segment pieces 15 (FIG. 4a).

To an outer circumferential surface of the main shaft 2 in opposition to the slit 19 is fixed a support member 51 extending in the axial direction of the main shaft 2. Joining pawls 54 and 55 extending in the axial direction of the main shaft 2 are rockably supported by an outer end of the support member 51 through a pair of shafts 52 and 53. These joining pawls 54 and 55 consist of a number of divided pieces spaced in the axial direction of the main shaft 2. Adjacent inner ends of joining pawls 54 and 55 overlap with each other and are formed with a number of grooves in their outer circumferences to be in contact with the carcass ply K in order to increase friction with the carcass ply K. Elastic tubes 56 and 57 in parallel with the main shaft 2 are interposed between the support member 51 and the inner ends of the joining pawls 54 and 55 and are supplied with pressurized air at a predetermined pressure through hoses and rotary joints (not shown).

As a result, the joining pawls 54 and 55 are rocked outwardly about the shafts 52 and 53 with the aid of the elastic tubes 56 and 57 expanding with the pressurized air. The joining pawls 54 and 55 and the elastic tubes 56 and 57 form as a whole a first joining unit 58 arranged facing the slit 19 in the forming drum 47.

A plurality of cylinders 61 are mounted on the support member 51, while an intermediate member 63 is secured to rod ends of piston rods 62 of the cylinders 61. Reference numeral 64 illustrates a number of regulating pins as clearance regulating members whose inner ends are fixed to the intermediate member 63. The regulating pins 64 are arranged in the proximity of the first joining unit 58 and radially extending and equally spaced a predetermined distance from each other in the axial direction. When the piston rods 62 are retracted in the cylinders 61, the regulating pins 64 are retracted in the cylindrical unit 13 as shown in FIG. 3. On the other hand, however, when the piston rods 62 are extended from the cylinders 61, outer ends of the regulating pins 64 extend through the slit 19 out of the cylindrical unit 13 so that the outer ends of the regulating pins 64 penetrate into the clearance S between the ends of the carcass ply K (FIG. 4b).

Above the forming drum 47 is arranged a movable frame 71 which is adapted to be moved by means of a driving mechanism (not shown) onto a lateral side to retract from the position immediately above the forming drum 47. Onto the movable frame 71 is fixed a guide block 72 through which are slidably inserted guide rods 73 extending in vertical directions. To lower ends of the guide rods 73 is fixed a lifter 74 extending in the axial direction of the main shaft 2 and adapted to be raised and lowered by a lifting mechanism, for example, a cylinder and crank mechanism (not shown). Joining pawls 77 and 78 similar in shape to the joining pawls 54 and 55 are rockably supported by the lifter 74 through shafts 75 and 76 in parallel with the shafts 52 and 53. The joining pawls 77 and 78 are formed with a number of grooves in lower surfaces of their inner ends to be in contact with the belt-shaped member.

Elastic tubes 79 and 80 similar to the elastic tubes 56 and 57 are interposed between the lifter 74 and the joining pawls 77 and 78. The joining pawls 77 and 78 and the elastic tubes 79 and 80 form as a whole a second joining unit 81 which is arranged out of the forming drum 47 and movable toward and away from the first joining unit 58. When the second joining unit 81 has approached first joining unit 58, both the ends E1 and E2 of the carcass ply K wound around the forming drum 47 are pulled closer together and butt joined at the slit 19 by the cooperation of the first and second joining units 81.

The operation of the apparatus of the preferred embodiment of the invention will be explained hereinafter.

It is now assumed that the forming drum 47 has been expanded to increase its diameter to a first intermediate diameter as shown in FIG. 4a. At this time, the respective suction passages 25 are connected to the vacuum source and the suction at the respective suction openings 26 is active. In this condition, a belt-shaped carcass ply having a predetermined length is supplied from a carcass ply supply mechanism (not shown) onto the forming drum 47, while the forming drum 47 is rotated about the main shaft 2 by means of the driving means to wind the carcass ply K around the cylindrical unit 13.

At this time, the carcass ply K is held on the forming drum at six positions by suction at the suction openings 26. In this case, as the length of the carcass ply K is slightly shorter than an outer circumferential length of the forming drum 47, a little clearance S is formed between both ends E1 and E2 of the carcass ply K wound around the forming drum 47. The carcass ply K has been wound around the forming drum 47 so that the clearance S between the ends E1 and E2 is aligned with the slit 19 of the forming drum 47. Thereafter, the forming drum 47 is rotated through a predetermined angle from the winding finished position so that the first joining unit 58 arrives at a top portion of the forming drum 47.

The cylinders 20 are then actuated to retract their piston rods 21. Therefore, the second segment pieces 15 of the arcuate segments 12a and 12b are rocked inwardly by gravity about the pins 18 until the extreme edges of the second segment pieces 15 abut against the joining pawls 54 and 55. Simultaneously with the above actuation of the cylinders 20, the cylinders 61 are actuated to extend their piston rods 62 so that the outer ends of the regulating pins 64 extend through the slit 19 out of the forming drum 47 to penetrate into the clearance S. As a result of the inward rocking of the second segment pieces 15 as above described, the ends E1 and E2 of the carcass ply K are moved somewhat toward each other to the close proximity of the regulating pins 64 extended as shown in FIG. 4b.

Figure 4C:
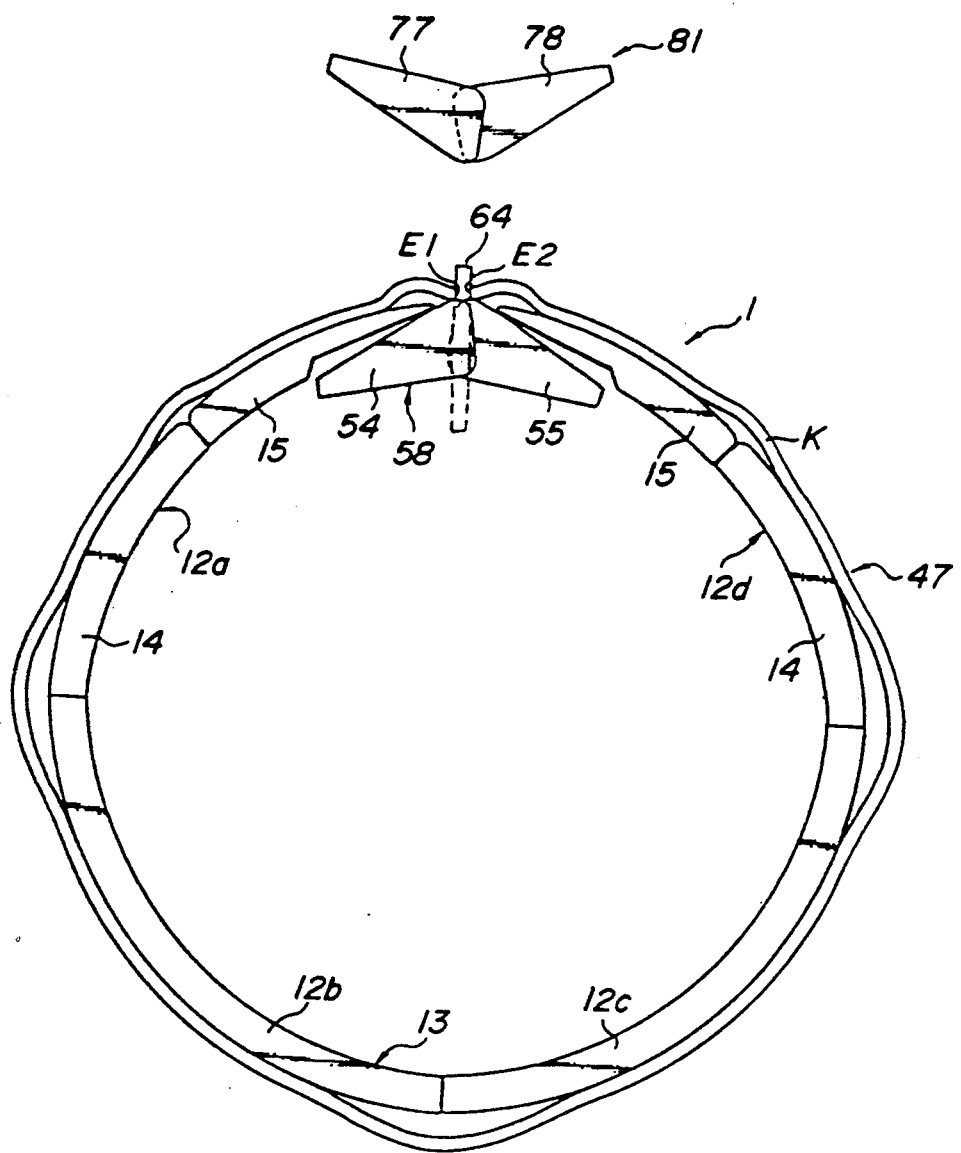

Thereafter, only the screw shaft 31 of the forming drum 47 is rotated by the driving means (not shown) so that the female screw blocks 34 and 35 are moved away from each other to rock the links 40 and 41 into tilted positions. Therefore, the arcuate segments 12 are moved radially inwardly in synchronism with each other so that the cylindrical unit 13 is contracted to reduce its diameter to the minimum as shown in FIG. 4c. As a result, the circumferential length of the forming drum 47 becomes shorter. However, because the carcass ply K is held at the six positions by suction at the suction openings 26, parts of the carcass ply K between the suction openings 26 are loosened to extend radially outwardly.

With such a contraction of the cylindrical unit 13, the ends E1 and E2 of the carcass ply K are moved further toward each other and pressed against surfaces of the regulating pins 64 on both sides thereof. As the number of the regulating pins 64 are arranged in the axial direction of the forming drum 47, the clearance S between both the ends of the carcass ply K is exactly regulated at a predetermined value by the abutment of the ends E1 and E2 against the regulating pins 64 as shown in FIG. 4c. As a result, when both the ends E1 and E2 are butt joined as later described, they can be joined with sufficient strength and with great certainty.

Thereafter, the lifter 74 and the second joining unit 81 positioned immediately above the forming drum 47 are lowered in unison so as to approach the first joining unit 58 positioned in the forming drum 47. On the other hand, the cylinders 61 are actuated to retract the piston rods 62 so that the regulating pins 64 are retracted into the cylindrical unit 13 to leave the clearance S. Moreover, when joining pawls 77 and 78 of the second joining unit 81 come into contact with outer circumferences of both the ends of the carcass ply K, both the ends of the carcass ply K are embraced on their inner and outer sides by the joining pawls 54, 55 and 77 and 78 of the first and second joining units 58 and 81. After this embracing, the lifter 74 and the second joining unit 81 are further lowered.

Therefore, the joining pawls 54, 55 and 77 and 78 of the first and second joining units 58 and 81 are pushed toward each other so that these joining pawls are rocked about the shafts 52, 53, 75 and 76 so as to assume horizontal positions, compressing the elastic tubes 56, 57, 79 and 80. As a result, both ends of the carcass ply K embraced by the first and second joining units 58 and 81 are pulled closer together at the slit 19 so that both the ends E1 and E2 are forced together and butt joined as shown in FIG. 4d. In this case, the first and second joining units 58 and 81 are arranged on the inner and outer sides of the forming drum 47, respectively. Therefore, the inner and outer faces of the carcass ply K are pulled by the first and second joining units 58 and 81, respectively so that both the ends E1 and E2 of the carcass ply K are joined on the forming drum with high strength in a reliable manner.

In this case, moreover, the suction passages 25 provided in the second segment pieces 15 are disconnected from the vacuum source to stop the suction through the suction openings 26. After both the ends E1 and E2 of the carcass ply K have been butt joined to form a carcass band B in this manner, the lifter 74 and the second joining unit 81 are raised to their initial positions. In this case, the joining pawls 54, 55, 77 and 78 of the first and second joining units 58 and 81 are rocked to return their initial positions with the aid of regaining action of the elasticity of the elastic tubes 56, 57, 79 and 80 owing to their elasticity. The elastic tubes 56, 57, 79 and 80 serve as returning means for the joining pawls.

Thereafter, the screw shaft 31 is rotated to move the screw blocks 34 and 35 toward each other so that the arcuate segments 12 are moved radially outwardly in synchronism with each other. With this operation, the forming drum 47 is expanded to increase its diameter from the minimum diameter to a second intermediate diameter which is slightly smaller than the first intermediate diameter. The movable frame 71 is then moved onto a lateral side by means of the driving mechanism (not shown) so as to be retracted from the position immediately above the forming drum 47. A pair of beads are then supplied from a bead supply mechanism (not shown) into predetermined positions on an outer side of the carcass band B. Thereafter, the suction passages 25 are disconnected from the vacuum source to eliminate the suction of the carcass band B.

The screw shaft 31 is then rotated to move the screw blocks 34 and 35 further toward each other so that the forming drum is expanded to increase its diameter to the maximum. As a result, the carcass band B is expanded to increase its diameter so that the pair of beads are pressure-joined at predetermined positions of the carcass band B. The beads are combined with the carcass band B in the period of time in which the carcass band B is still mounted on the forming drum 47 in this manner. Therefore, the beads can be exactly set relative to the carcass band B. Moreover, as the beads are combined with the carcass band B in this period, the carcass band B can be transferred by grasping the beads thereafter. In other words, the carcass band B having a relatively low rigidity can be easily handled in following processes.

After the beads joined with the carcass band B have been grasped on their outside by means of a transfer mechanism, the screw shaft 31 is rotated to contract the forming drum to reduce its diameter to the minimum. The carcass band B with the beads is then removed from the forming drum 47 and transferred to a new station for the next process by means of the transfer mechanism. Thereafter, the screw shaft 31 is rotated to expand the forming drum 47 to increase its diameter to the initial first intermediate diameter. The above is one cycle of the operation of the embodiment of the invention. This cycle is repeated hereafter.

The forming drum 47 is formed with the slit 19 extending in the axial direction of the forming drum 47 in the above embodiment. The slit 19 may extend substantially in the axial direction of the forming drum 47 but is somewhat inclined relative to the axial direction according to the invention. Although the first and second joining units 58 and 81 comprise the joining pawls 54, 55 and 77 and 78 in the above embodiment, guide rollers and frustoconical joining rollers as explained in the preamble of this specification as prior art may be used for the first and second joining units according to the invention. Furthermore, although the second joining unit 81 comprises the joining pawls 77 and 78 extending in the axial direction of the forming drum 47 in the above embodiment, the second joining unit may comprise a rotary disc-shaped member and a number of pairs of joining pawls provided on an outer circumference of the disc-shaped member. In this case, after the disc-shaped member has been moved toward the first joining unit and pressed thereagainst, the disc-shaped member is moved in the axial direction of the forming drum 47 so that both the ends of the belt-shaped member are successively butt joined.

Although the link mechanism has been used for moving the arcuate segments 12 in radial directions in the above embodiment, conical cams and the like may by used for the purpose. Moreover, permanent magnets may be used for holding the carcass ply on the forming drum 47 in place of the suction means. Further, the first and second joining units 58 and 81 may be moved toward and away from each other by moving the forming drum 47 together with the first joining unit 58. Although the regulating pins 64 as clearance regulating members have been arranged in the proximity of the first joining unit 58, the regulating pins 64 may be arranged in the vicinity of the second joining unit 81 so that the regulating pins 64 may penetrate into the clearance S by extending the regulating pins 64 through the slit 19 into the inside of the cylindrical unit 13.

As can be seen from the above explanation, both ends of a belt-shaped member can be butt joined by pulling the both ends closer together on inner and outer sides of the belt-shaped member wound around a forming drum according to the invention. Therefore, the joined strength of the belt-shaped member can be improved according to the invention.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An apparatus for forming an endless or cylindrical member from a belt shaped member, comprising a forming drum having a cylindrical unit composed of a plurality of arcuate segments radially movable for changing the outer diameter of the cylindrical unit, having a slit in the cylindrical unit extending in an axial direction of the cylindrical unit between two adjacent arcuate segments, wherein each of the said two adjacent segments are rockably hinged to respective other arcuate segments, means for winding the belt-shaped member around the cylindrical unit such that a slight clearance between the ends of the belt-shaped member is aligned with the slit of the cylindrical unit, a first joining unit arranged inside the forming drum and aligned with the slit, a second joining unit arranged outside the forming drum and movable toward and away from the first joining unit when the second joining unit is in alignment with the slit for pulling closer together the inside and outside of the ends of the belt-shaped member wound around the cylindrical unit and butt joining the ends in cooperation with the first joining unit, and diameter changing means for moving the arcuate segments in the radial direction of the cylindrical unit to increase and decrease its diameter.

2. The apparatus for forming a cylindrical member as set forth in claim 1, wherein said forming drum further comprises clearance regulating means having clearance regulating members capable of the penetrating into the clearance between both the ends of the belt-shaped member to regulate the clearance between both the ends of the belt-shaped member.

3. The apparatus for forming a cylindrical member as set forth in claim 1, wherein said arcuate segments comprises suction passages extending in the axial direction of the cylindrical unit and a number of suction openings formed in circumferential surfaces of the arcuate segments in communication with the suction passages.

4. The apparatus for forming a cylindrical member as set forth in claim 1, wherein each of said adjacent arcuate segment defining the slit therebetween consists of a first segment piece and a second segment piece and pivotably connected at one end to the first segment piece and adapted for moving the other end in the radial direction to move the ends of the belt-driven member toward each other.

5. An apparatus for forming a cylindrical member as set forth in claim 2, wherein said forming drum includes diameter changing means comprising guide members having a plurality of guide grooves formed in their surfaces in opposition to each other, connecting ribs extending in parallel with each other and circumferentially substantially equally spaced and having forward and rearward ends slidably inserted in the guide grooves of the guide members, a screw shaft formed on its forward and rearward ends with male screws in opposite directions, female screw blocks threadedly engaged on the male screws of the screw shaft, respectively, annular members connected to the female screw blocks, respectively, and links whose inner ends are pivotally connected to the annular members and outer ends are pivotally connected to the connecting ribs, whereby when the screw shaft is rotated, the arcuate segments of the cylindrical unit fixed to the connecting ribs are moved in radial directions to increase and decrease the diameter of the cylindrical unit.

6. An apparatus for forming a cylindrical member as set forth in claim 2, wherein said forming drum includes clearance regulating means fixed to rod ends of piston rods of a plurality of cylinders mounted on a support member fixed in the cylindrical unit in opposition to the slit thereof.

7. An apparatus for forming a cylindrical member as set forth in claim 1, wherein each of the first and second joining units comprises joining pawls and returning means for returning the joining pawls into original positions after completion of butt joining of the ends of the belt-shaped member.

8. An apparatus for forming a cylindrical member as set forth in claim 7, wherein said joining pawls extend in the axial direction of the cylindrical unit and are rockably supported, the joining pawls consist of a number of divided pieces spaced in the axial direction of the cylindrical unit and whose adjacent inner ends overlap with each other and formed with a number of grooves in their outer circumferences to be in contact with a belt-shaped member in order to increase friction with the belt-shaped member.

9. An apparatus for forming a cylindrical member as set for in claim 7, wherein said returning means for returning the joining pawls into original positions comprises elastic tubes arranged on an opposite side of a belt-shaped member with respect to the joining pawls, the elastic tubes extending in the axial direction of the cylindrical unit and to be supplied with pressurized air so as to be expanded to drive the joining pawls into original positions.

* * * * *